United States Patent [19]

Martin

[11] 4,255,791
[45] Mar. 10, 1981

[54] SIGNAL PROCESSING SYSTEM

[75] Inventor: Gayle P. Martin, Indialantic, Fla.

[73] Assignee: Harris Corporation, Melbourne, Fla.

[21] Appl. No.: 965,778

[22] Filed: Dec. 4, 1978

[51] Int. Cl.³ .......................... H04B 3/14; H04B 1/10
[52] U.S. Cl. .................................. 364/514; 364/574; 375/14; 375/99; 455/296
[58] Field of Search ............... 364/819, 822, 514, 574, 364/724, 728; 328/165, 166, 167; 375/14, 18, 83, 99, 103; 455/296, 304, 305, 310

[56] References Cited

U.S. PATENT DOCUMENTS

| | | | |
|---|---|---|---|
| 3,543,012 | 11/1970 | Courtney | 364/724 |
| 3,588,385 | 6/1971 | Moye | 364/824 X |
| 3,810,067 | 5/1974 | Heidecker | 328/167 X |
| 3,921,072 | 11/1975 | Sato | 375/14 |
| 3,993,956 | 11/1976 | Gilmore et al. | 364/724 X |
| 4,097,866 | 6/1978 | Frost et al. | 364/574 X |

OTHER PUBLICATIONS

Lee et al., Correlation Functions and Communication Applications Electronics, Jun. 1950, pp. 86–92.
Lee et al., Application of Correlation Analysis to the Detection of Periodic Signals in Noise, Proceedings of the I.R.E., Oct. 1950, pp. 1,165–1,171.
Harris and Crede, Shock and Vibration Handbook, McGraw-Hill Book Co., 1964, vol. 2, pp. 22–23 to 22–26.
Sambur, Adaptive Noise Cancelling for Speech Signals, IEEE Transactions on Acoustics, Speech and Signal Processing, vol. ASSP-26, No. 5, Oct. 1978, pp. 419–423.

*Primary Examiner*—Felix D. Gruber
*Attorney, Agent, or Firm*—Craig & Antonelli

[57] ABSTRACT

An adaptive array signal processing system employs a correlation discriminant operator or signal recognizer. The operation of the signal recognizer is dependent upon noise decorrelation rather than noise filtering, so that an unbiased, although sometimes noisy, measurement of desired signal power can be effected on an instantaneous basis. In the signal recognizer, an input signal, as derived from the summation of a plurality of weighted signal receiver outputs, e.g. antenna voltages, and containing both information and noise, is combined with an a priori reference signal through a time delay multiplication process. The combined or output signal of the signal recognizer contains an information component that is effectively correlated with the information component in the input and a noise component that is effectively uncorrelated with any other signal in the system. Within the adaptive system of the present invention, the signal recognizer is incorporated in a weight control circuit that employs a positive signal feedback network for obtaining an optimal signal-to-noise ratio. Within the weight control circuit, the correlation discriminant operator properties are advantageously employed to cause desired terms, namely, the signal components of interest, to largely retain their correlation properties, while causing the undesired terms, e.g. noise, jamming, etc., to become uncorrelated with other signals, so that a weight control signal that achieves a maximizing of the signal-to-noise ratio can be produced.

43 Claims, 25 Drawing Figures

SIGNAL PROCESSING SYSTEM

FIELD OF THE INVENTION

The present invention relates to communications systems and is particularly directed to a scheme for providing antijam protection for an adaptive array receiver.

BACKGROUND OF THE INVENTION

In order to obtain the gradient of measured performance, conventional high performance adaptive arrays employ RF or IF correlation. For limiting the correlation, and thus the adaptive processor, to the RF bandwidth of interest and to provide adequately high level RF/IF inputs, there must be effectively incorporated into the system RF and IF stages of a high quality receiver at each antenna input. Since this approach is expensive, it is economically important that, at present, there exist many thousands of unprotected radio links that require antijam protection and that already incorporate expensive high quality radios.

One example of a conventional scheme for minimizing the need for expensive RF/IF correlators is a signal processing system using weight perturbations coupled with the measurement of changes in receiver output performance measure. As is shown in FIG. 1, in such a system the output of each of an array of antennas 1-1 to 1-N is coupled to a respective receiver multiplier 2-1 to 2-N. Each multiplier 2-i multiplies the output $x_i(t)$ by the sum of calculated weight and performance values $w_i$ and $p_i(t)$ supplied to adders 3-1 to 3-N and supplies these products to an adder 4 wherein the products $x_1(t)[w_1+p_1(t)] \ldots x_N(t)[w_N+p_N(t)]$ are summed. The output of adder 4 is coupled to a receiver 5 which amplifies and filters the summation signal to the bandwidth of interest. The IF output of receiver 5 is supplied to circuits 6 and 7 in which the total output power Ps+N (signal plus noise) and total signal power Ps are derived. To derive the total power (Ps+N), circuit 6 squares the IF output voltage of receiver 5 and passes the squared voltage through a lowpass filter. To derive the signal power Ps, circuit 7 consists of a matched filter for the described signal followed by a power detector and lowpass filter. The time delay $\tau s$ through signal power detection circuit 7 is approximately equal to the reciprocal of the bandwidth of the bandpass filter plus the reciprocal of the bandwidth of the lowpass filter. These power values are, in turn, coupled to weight and perturbation value calculator circuit 8 which generates the values $w_i$ and $p_i(t)$ in accordance with a prescribed algorithm. Calculation circuit 8 adjusts the array weights in accordance with whether or not the performance measure is improved as different weight and perturbation values are applied to summing circuits 3-1 to 3-N.

Unfortunately, the above-described conventional scheme suffers from the following drawbacks. First, the performance measure estimate cannot be accurately obtained for a given change in the weight vector until a time delay greater than $\tau s$ has expired. As a result, the iteration rate of the adaptive system is limited not by the bandpass of receiver 5, but rather by the bandpass of the desired signal estimation filter. Secondly, the estimate of the output desired signal power is in error since some of the receiver output noise is not rejected by the desired signal matched filter; accordingly, the performance measure estimate is biased by some unknown quantity.

SUMMARY OF THE INVENTION

In accordance with the present invention, rather than attempt to adapt the array on the basis of noise filtering techniques as has been done in the prior art, emphasis is shifted from the desired signal estimation function to a discrimination function, specifically, through the use of a correlation discriminant operator or signal recognizer. The operation of the signal recognizer is dependent upon noise decorrelation rather than noise filtering, so that an unbiased, although sometimes noisy, measurement of desired signal power can be effected on an instantaneous basis. In the signal recognizer an input signal, containing both information and noise, is combined with an a priori reference signal through a time delay multiplication process. The combined or output signal of the signal recognizer contains an information component that is effectively correlated with the information component in the input and a noise component that is effectively uncorrelated with any other signal in the system. Within the adaptive system of the present invention, the signal recognizer is incorporated in a weight control circuit that employs a positive signal feedback network for obtaining an optimal signal-to-noise ratio. Within the weight control circuit, the correlation discriminant operator properties are advantageously employed to cause desired terms, namely, the signal components of interest, to largely retain their correlation properties, while causing the undesired terms, e.g. noise, jamming, etc., to become uncorrelated with other signals, so that a weight control signal that achieves a maximizing of the signal-to-noise ratio can be produced.

In a spread spectrum environment, information for adaptive array control can be obtained in a period of time approximately proportional to the inverse of a desired signal's spread bandwidth, in contrast to a conventional technique which requires a period of time proportional to the desired signal's information bandwidth. An improvement in the time delay reduction of at least two orders of magnitude can be obtained with corresponding improvement in the adaptive array response time.

Moreover, even if the desired signals are not spread spectrum, but are, instead, identified through their carrier or a pilot tone, substantial improvements are obtained through the use of the correlation discriminant operator properties of the signal recognizer, since conventional techniques would narrowband filter either the carrier or the pilot tone; such narrowband filtering is not required when using the signal recognizer of the present invention.

In the description of the various systems and schematic illustrations presented in the various Figures of the drawings, components are designated by graphical representations commonly employed in the art and are not to be taken as limited to only a single type of device. Since the individual components themselves are not the subject matter of the invention but are instead, well known, a detailed illustration and description of each of the components has been omitted in order to provide a concise description of the invention.

DETAILED DESCRIPTION

Before describing, in detail, an overall adaptive array receiver system into which the signal recognizer and the positive signal feedback weight control schemes of the present invention may be incorporated, a discussion of some of the functions and theory of operation of the signal recognizer will be presented, in order to facilitate an understanding of its use within the array system.

The entity, signal recognizer, as used in the present specification, refers to a signal operator that operates as a correlation discriminant operator, requiring an a priori discriminant that uniquely identifies the desired signal. Specifically, a desired signal must be composed of products, a suitable term of which must be known. This requirement of the present invention differs considerably from the classical conventional formulation which requires that one know the entire signal.

In the foregoing, the signal recognizer of the present invention was described as being a correlation discriminant operator. In accordance with this property, the signal recognizer transforms a function having both desired and undesired terms, so as to cause the desired terms of the output to largely retain their correlation properties, while simultaneously causing the undesired terms of the output to become uncorrelated with any other waveform present in the system.

A required input to the signal recognizer is an a priori known product term of the desired waveform. In a spread spectrum environment, for example, a desired signal $S(t)$ may be expressed as the product:

$$S(t) = AC(t)d(t) \cos(\omega_c t); \quad (1)$$

wherein:

A is the unknown amplitude, d(t) is unknown data,

C(t) is a known pseudo-random bandwidth spreading function, and $\omega_c$ is the carrier frequency which may be doppler shifted by an unknown and arbitrary amount. As will be described below, in connection with the description of a spread spectrum PSK signal, either $C(t)$ or $\cos(\omega_c t)$ can be chosen as the a priori input.

Figure 1:
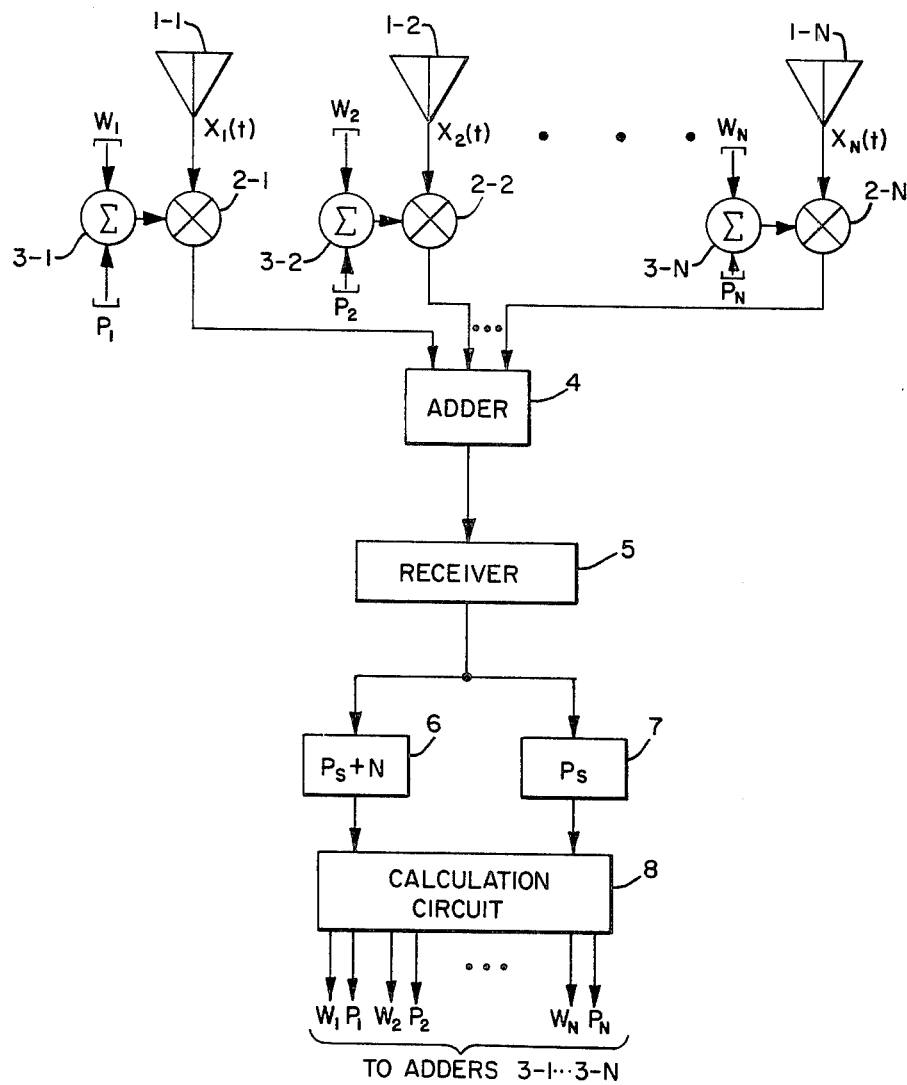
FIG. 1 depicts a schematic block diagram of a conventional adaptive array receiver system.
Figure 2:
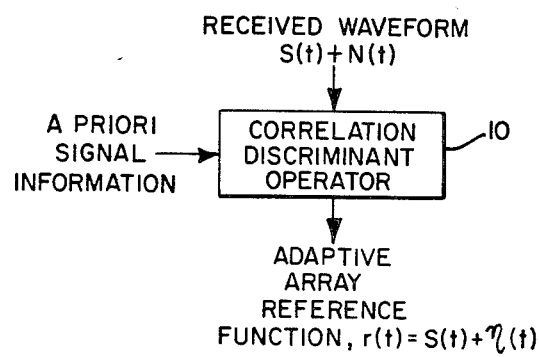
FIG. 2 is a simplified block diagram of a signal recognizer.

A conceptual block diagram of a generalized signal recognizer is shown in FIG. 2. As is shown therein, a received signal waveform consisting of signal $S(t)$ and noise $N(t)$ is applied to the input of the signal recognizer 10 as is a priori signal information. At the output of the signal recognizer 10 there is obtained the function $r(t)$ which consists of a signal component $S(t)$ and an uncorrelated noise component $\eta(t)$. The required zero correlation with $\eta(t)$ may be expressed in equations (2) and (3) as follows:

$$\underset{T \to \infty}{Lim} \frac{1}{T} \int_t^{t+T} S(t)\eta(t)dt = 0 \quad (2)$$

and $$\underset{T \to \infty}{Lim} \frac{1}{T} \int_t^{t+T} n(t)\eta(t)dt = 0. \quad (3)$$

In some applications, the output of the signal recognizer contains a signal component which is only partially correlated with the input signal term. In this case, it can be shown that the uncorrelated portion of $S(t)$ can be incorporated into $\eta(t)$ without loss of generality. Although the desired output signal is not a direct replica of the desired input signal, it is, nevertheless, highly correlated with the input signal, and from a correlation standpoint the "lost" signal power can be made up with amplifier gain.

Figure 3:
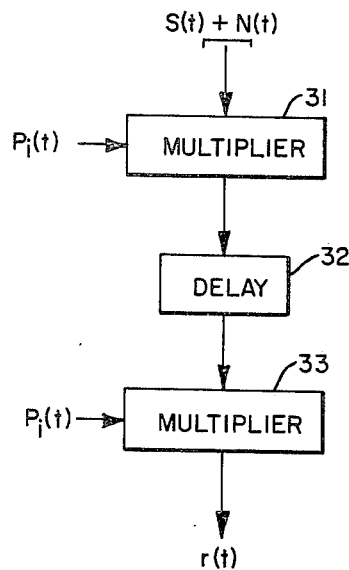
FIGS. 3 and 4 illustrate practical general schematic configurations of a signal recognizer.
Figure 4:
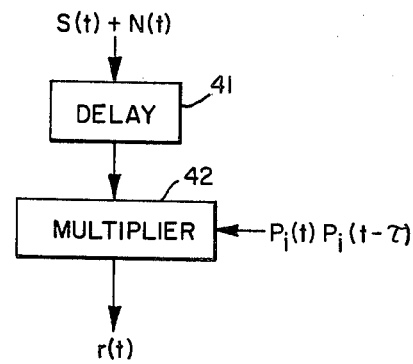

Two practical embodiments of signal recognizer circuits are illustrated in FIGS. 3 and 4. As shown in FIG. 3, the signal recognizer may consist of a multiplier 31 for multiplying the input $S(t)+N(t)$ by an a priori known function $P_i(t)$, a delay 32 connected to the output of multiplier 31, and a further multiplier 33, connected to the output of delay 32, for multiplying the delayed product by the a priori known function $P_i(t)$. Equivalently, as shown in FIG. 4, the signal plus noise $S(t)+N(t)$ may be delayed in delay 41 by an amount $\tau$ and then multiplied in a multiplier 42 by the combined product of the a priori known function $P_i(t)$ times the delayed a priori known function $P_i(t-\tau)$. The time delay is chosen so that the a priori known function $P_i(t)$ times the delayed a priori known function $P_i(t-\tau)$ has small or zero correlation.

As was explained above, the signal recognizer is applicable to signals which can be expressed as a series of products; that is $$S(t) = P_1(t)P_2(t) \ldots P_n(t). \quad (4)$$

Since the signal recognizer functions as a correlation discriminant operator, equations (2) and (3), for the signal recognizer configurations shown in FIGS. 3 and 4, may be rewritten as $$0 = \underset{T \to \infty}{Lim} \frac{1}{T} \int_t^{t+T} P_i(t)N(t-\tau)dt \quad (5)$$

-continued $$0 = \lim_{T \to \infty} \int_t^{t+T} P_i(t)P_i(t-\tau)N(t)N(t-\tau)dt \quad (6)$$

where $P_i(t)$ is the selected a priori discriminant term and $N(t)$ is any coherent interference plus any incoherent noise present in the system. Thus, the term $N(t)$ is composed of everything that is not desired signal.

Equation (5) requires that the a priori known function $P_i(t)$ be unique to the signal and is the usual assumption made in spread sprectrum communications. Equation (6) is somewhat more restrictive in that the product of the a priori function $P_i(t)$ times the delayed version of the same function $P_i(t-\tau)$ must also not be correlated with noise times $N(t)$ delayed noise $N(t-\tau)$. In many signal environments this is a rather esoteric requirement, although, for some forms of modulation, such correlations could inadvertently exist. An example will be discussed below in connection with an AM signal recognizer.

Finally, if useful desired signal correlations are to be obtained, the following equation (7) must hold:

$$P_j(t-\tau) \approx P_j(t). \quad (7)$$

In equation (7), the subscript j refers to any of the products comprising the signal which are not the a priori known function. In essence, this requirement means that the delayed partial signal cannot be too different from the undelayed version of the signal; therefore, if $P_j(t)$ changes faster than $P_i(t)$, $P_j(t)$ must be periodic. In practice, this requirement of equation (7) also sets limits on the maximum value that can be obtained by the signal recognizer time delay.

Figure 5:
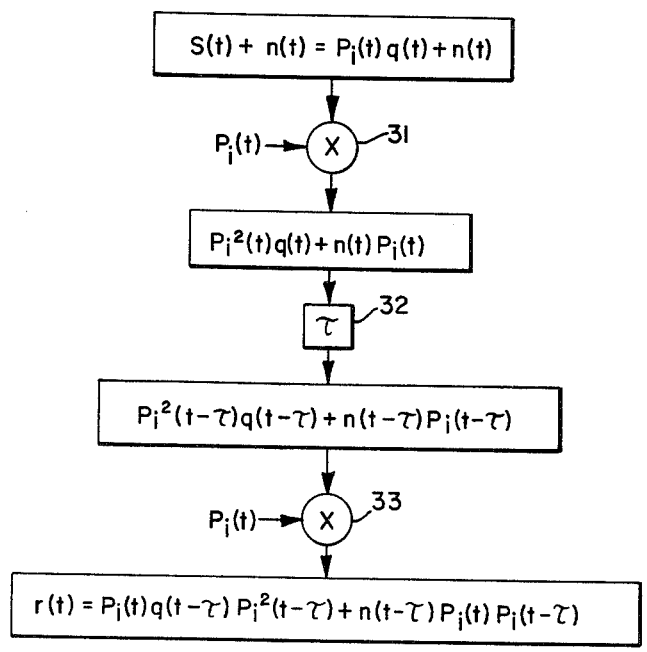
FIG. 5 depicts the functional signal flow through the signal recognizer shown in FIG. 3.

FIG. 5 is a signal plus noise flow chart of the signal recognizer configuration shown in FIG. 3. It is assumed that the input waveform of the signal recognizer consists of signal plus noise. In FIG. 5, the signal of interest $S(t)$ has been expressed as the product of the a priori known function $P_i(t)$ with the remainder of the signal which is referred to here as $q(t)$. Therefore, at the output of multiplier 31, the composite waveform may be expressed as:

$$P_i^2(t)q(t) + n(t)P_i(t). \quad (8)$$

After passing through delay 32, the composite represented by equation (8) may be expressed as:

$$P_i^2(t-\tau)q(t-\tau) + n(t-\tau)P_i(t-\tau). \quad (9)$$

In multiplier 33, the waveform represented by equation (9) is multiplied by the a priori known function $P_i(t)$ to obtain the waveform $r(t)$, where:

$$r(t) = [P_i(t)Q(t-\tau)P_i^2(t-\tau)] + [N(t-\tau)P_i(t)P_i(t-\tau)]. \quad (10)$$

It should be noted here that the term proportional to the desired signal contains the $i^{th}$ product squared; even though this function is delayed, this matters little because this is a power term. On the other hand, the term proportional to noise contains the known a priori function $P_i(t)$ times itself delayed $P_i(t-\tau)$; by design constraints this product is ensured to have small or zero expected value.

Considering now the calculations of the correlation of the incident composite waveform (the vector $x(t)$) with the reference function $r(t)$ obtained from the signal recognizer and represented by equation (10). The correlation of incident signal $S(t)$ with $r(t)$ is:

$$\frac{1}{T} \int_t^{t+T} S(t)r(t)dt = \quad (11)$$

$$\frac{1}{T} \int_t^{t+T} P_i^2(t)P_i^2(t-\tau)q(t)q(t-\tau)dt +$$

$$\frac{1}{T} \int_t^{t+T} P_i^2(t)P_i(t-\tau)n(t-\tau)dt.$$

It should also be noted here that the $i^{th}$ product squared is a positive nonzero quantity plus an alternating term. Defining the expected value of $P_i^2$ as $C_i^2$ and using the fact that P and q are assumed to be independent allows equation (11) to be simplified as:

$$\frac{1}{T} \int_t^{t+T} S(t)r(t)dt = \quad (12)$$

$$C_i^4 \int_t^{t+T} q(t)q(t-\tau)dt + C_i^2 \int_t^{t+T} P_i(t-\tau)n(t-\tau)dt$$

According to the basic assumption, the $i^{th}$ product is a unique signal discriminant. Therefore, using equation (5), the second integral is zero, so that $$\frac{1}{T} \int_t^{t+T} S(t)r(t)dt \approx C_i^4 C_q^2 \quad (13)$$

where $C_q^2$ is defined as the expected value of $q(t)q(t-\tau)$. Therefore, $$C_q^2 = 1/T \int q(t)q(t-\tau)dt \neq 0. \quad (14)$$

From equation (14), it is apparently necessary to choose the time delay $\tau$ so that the signal term $q(t)$ when delayed by an amount $\tau$ is still approximately equal to that function without a delay. If the desired signal were an amplitude modulated waveform and the a priori known function were the carrier term, then the term $q(t)$ would represent the modulation function. If the time delay $\tau$ is, for example, a quarter of an RF cycle, then it is evident that the modulation is trivially changed in this time. Thus $$q(t) = q(t-\tau). \quad (15)$$

Having explained, in detail, the conditions necessary for the signal vector to correlate with the array reference function, the conditions necessary for ensuring that the noise waveform vector does not correlate with the array reference function will now be explained.

Correlation of noise with the reference function may be calculated as follows:

$$\frac{1}{T} \int n(t)r(t)dt = \frac{1}{T} \int_t^{t+T} n(t)P_i^2(t-\tau)P_i(t)q(t-\tau)dt + \quad (16)$$

$$\frac{1}{T} \int_t^{t+T} n(t)n(t-\tau)P_i(t)P_i(t-\tau)dt.$$

Again, the first integral is zero according to the assumption of a unique signal discriminant equation (5). The second integral, expressed earlier as equation (6), is fundamental to the theory of the correlation discriminant operator. Specifically, it establishes the condition that signal recognizer output noise will not be correlated with any other noise in the system. As was explained above, this integral must be forced to zero. Under ordinary circumstances, independence of n(t) and P(t) is sufficient to ensure zero correlation.

More importantly, the term $P_i(t)P_i(t-\tau)$ can be controlled so as to ensure that the term has zero expected value. Then, unless, in some way, alternating components of this product can in some way correlate with alternating terms in $n(t)n(t-\tau)$, the entire integral will be zero.

In general, the product of noise with delayed noise will not be zero. Namely $$n(t)n(t-\tau) = C_n^2 + h(t) \qquad (17)$$

where the term $C_n^2 \neq 0$. The term h(t) is an alternating quantity which has zero average value. Similarly, the a priori product may be expressed as $$P_i(t)p_i(t-\tau) = C_p^2 + f(t). \qquad (18)$$

If the a priori disciminant waveshape and the time delay $\tau$ are appropriately chosen, it can be ensured that:

$$C_p^2 = 0 \qquad (19)$$

Alternatively, in a spread spectrum modulation environment, where p(t) is a pseudo-random sequence generated from an m bit register, then $\tau = 1$ chip period will result in $C_p^2$ having the value $(2^m-1)^{-1}$; therefore, if the sequence is sufficiently long, $C_p^2$ is approximately zero.

In most practical applications, it is sufficient only to require that $C_p^2$ be small or zero, in order to ensure that the signal recognizer noise term $\eta(t)$ is uncorrelated as desired. Nevertheless, it must be realized that a nonzero expected value for this correlation can be obtained even though $C_p^2 = 0$ if the functions f(t) and h(t) are correlated. In the subsequent description of an amplitude modulation signal recognizer, it will be shown how such correlation can exist. It is then pointed out that such correlation can usually be eliminated by appropriate filtering, either in the signal recognizer or following it.

Having described the operational principles involved in the correlation discriminant properties possessed by a signal recognizer, the description to follow will treat specific applications of the signal recognizer to particular signal modulation environments.

PSK SIGNAL RECOGNIZER

Consider first a biphase PSK (phase shift keying) spread spectrum signal, because of its well defined correlation properties and precise phase shift characteristics.

For convenience, equation (1) is reproduced here.

$$S(t) = AC(t)d(t) \cos (\omega_c t). \qquad (1)$$

Figure 7:
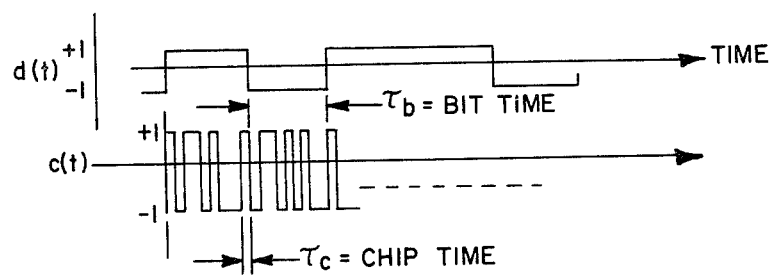
FIG. 7 depicts signal waveforms useful in explaining the operation of the signal recognizer shown in FIG. 6.

Within the signal, for biphase PSK, both C(t) and d(t) are biphase quantities ($\pm 1$). Data information changes much more slowly than the spreading function C(t) changes. Example waveforms are shown in FIG. 7 for this signal. The reference function r(t) is given by equation (10), repeated here:

$$r(t) = P_i(t)q(t-\tau)r_i^2(t-\tau) + P_i(t)P_i(t-\tau)n(t-\tau). \qquad (10)$$

Figure 6:
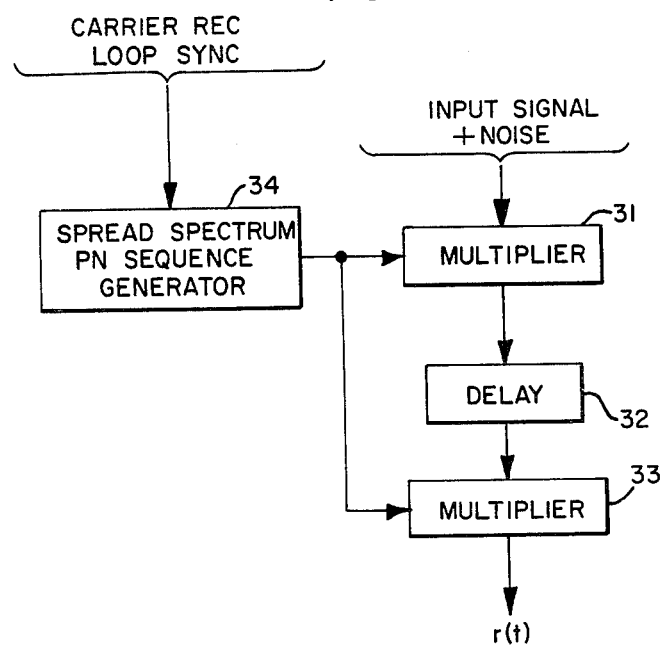
FIG. 6 is a schematic block diagram of a spread spectrum PSK signal recognizer.

A suitable configuration for the signal recognizer, corresponding to that shown in FIG. 3, is illustrated in FIG. 6. Again, as in the configuration shown in FIG. 3, the input signal is coupled to one input of a multiplier 31. A second input of multiplier 31 is coupled to the output C(t) of a suitable spread spectrum PN sequence generator 34, which generates a PN sequence corresponding to that used in the original scrambling transmitter. The PN sequence produced by generator 34 is, of course, synchronized with the input signal applied to multiplier 31 in a conventional manner in a suitable receiver carrier recovery loop, not shown. The components and operation of carrier recovery circuitry, per se, are well known, do not form part of the present invention, and, accordingly, have not been illustrated or described. The output of PN sequence generator 34 is also coupled to one input of multiplier 33. The output of multiplier 31 is delayed via delay 32 and applied to a second input of multiplier 33. The output of multiplier 33 represents the desired reference signal r(t). Here, of course, the a priori known term is the spreading sequence C(t). FIG. 7 shows exemplary waveforms for the components d(t) and C(t) in the presently described spread spectrum environment. Recalling that the term q(t) is the product of all terms comprising the desired signal, except for the a priori discriminant function, then applying the definition of q(t) gives $$q(t) = Ad(t) \cos (\omega_c t). \qquad (20)$$

Using equation (10), that P(t) = C(t) and recognizing that $C^2(t) = 1$, there is obtained $$r(t) = AC(t)d(t-\tau) \cos (\omega_c t - \omega_c \tau) + C(t)C(t-\tau)n(t-\tau). \qquad (21)$$

According to the above discussion of signal recognizer principles, the expected value coefficient of noise in the reference function is to be made equal to zero or nearly zero. This can be done by choosing the delay time $\tau$ of delay 32 as follows $$\tau \geq \tau_c \qquad (22)$$

where the term $\tau_c$ is identified in FIG. 7 as the period of a pseudo-random chip. In this case, the expected value coefficient of the noise term is $(2^m-1)^{-1}$, where m is the number of bits in the pseudo-random generator 34. Thus, relatively short code sequences can ensure negligible correlation terms.

In order to preserve reasonable desired signal correlations, equation (14), which states that $q(t)q(t-\tau)$ must correlate, must be satisfied. For data having more or less equal probability of sign, this means that the signal recognizer time delay $\tau$ cannot exceed the duration of one data bit, $\tau_b$; thus, one must also require that $$\tau \leq \tau_b. \qquad (23)$$

Finally, some adaptive array weight control decisions, particularly the positive signal feedback control to be described below, require that phase be preserved in the signal recognition operation. This constraint additionally requires $$\omega_c\tau = k(2\pi), \text{ where } k = \text{an integer.} \tag{24}$$

Although the above-described relationships are generally applicable to a PSK spread spectrum environment, additional criteria may be in order. For example, if it is desirable to maximize desired signal correlations, then the time delay $\tau$ should be just slightly greater than one chip time. Alternatively, if suppression of the uncorrelated noise term $\eta(t)$ is of paramount importance, then realization of the time delay may be achieved with a bandpass filter. In this case, selection of $\tau$ as approximately ½ bit time sacrifices only 3 dB of desired signal correlation while achieving only 3 dB less than the maximum possible rejection of noise. It should be noted, however, that ordinarily, bit times are relatively long and maintaining the phase stability of such a filter may be difficult. Furthermore, some very fast adapting algorithms for obtaining the array weights may not suitably employ such long delay signal recognizers.

It should also be observed that even if the noise term $\eta(t)$ produces non-zero correlations, such correlations may not be greatly detrimental to an adaptive processor, to be described more fully below. As long as the reference signal provided to the error formation difference port has correlated noise terms with amplitude less than that required to change the sign of the net noise correlations, then the adaptive array will suppress these terms regardless.

In strict mathematical terms, the result obtained is equivalent to a reduction in the power of those correlated noise components. Correlation in $\eta(t)$ as large as ½ as referenced to the array error formation difference port would effectively reduce a jammer's power by 3 dB. Ordinarily, this would only modestly reduce null depth performance of the adaptive processor.

Therefore, even though the signal recognizer can theoretically produce arbitrarily small or zero correlation noise terms, considerable tolerance in the actual PSK spread spectrum embodiment is allowed.

Instead of having chosen the PN sequence as the a priori known discriminant for the present embodiment, the carrier term $\cos(\omega_c t)$ could have been used. For this selection, the signal recognizer would be the same as that discussed next, an Amplitude Modulation Signal Recognizer.

AM SIGNAL RECOGNIZER

For an amplitude modulated signal the information signal S(t) may be expressed as:

$$S(t) = A[1 + m(t)] \cos \omega_c t. \tag{25}$$

Here the term $\cos \omega_c t$ is chosen to be the a priori known signal discriminant $P_i(t)$. The AM signal recognizer may be configured as illustrated in FIGS. 8 and 9.

Figure 8:
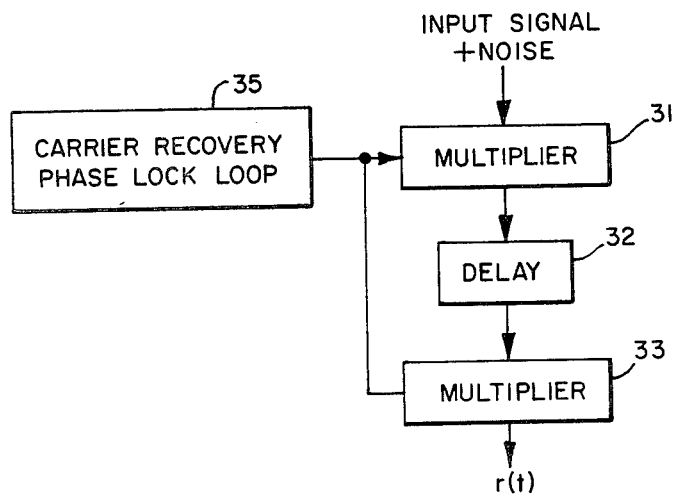
FIGS. 8 and 9 are schematic block diagrams of a signal recognizer for processing an AM signal.

The configuration shown in FIG. 8 includes a multiplier 31 having a first input coupled to receive the input signal S(t)+N(t) at one input thereof. A second input of multiplier 31 may be derived from the VCO in the carrier recovery loop 35, the VCO output being expressed as $\cos \omega_c t$, where $\omega_c$ is the recovered carrier frequency. This $\cos \omega_c t$ signal is also coupled to one input of a second multiplier 33. A second input of multiplier 33 is derived via delay 32 which is coupled to the output of multiplier 31. The output of multiplier 33 is the desired reference signal function r(t).

Figure 9:
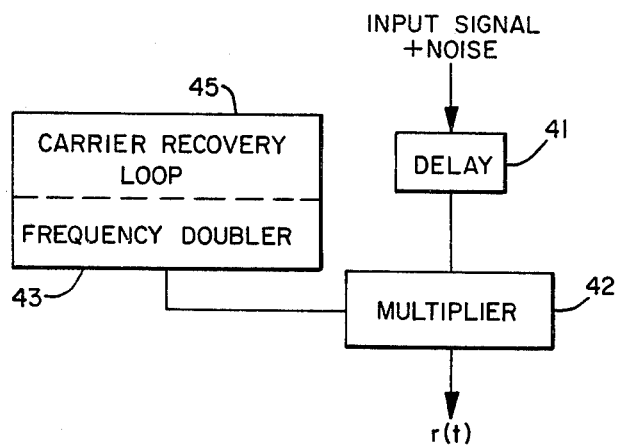

The circuit configuration as shown in FIG. 9 includes a delay 41 to which the input signal S(t)+N(t) is applied. The output of delay 41 is coupled to a first input of multiplier 42, a second input of which is derived from frequency doubler 43 that produces a sinusoidal output at twice the carrier frequency $f_c$ produced by carrier recovery loop 45. (To obtain the sinusoid of twice the recovered carrier frequency, the output of the loop VCO may be multiplied by the output of a series $\pi/2$ delay connected in the loop feedback circuit, in a conventional manner, the product $(\sin \omega_c t)(\cos \omega_c t)$ being equal to ½ $\sin 2\omega_c t$.) The product output of multiplier 42 is the desired reference signal function r(t). As will be described in detail below, the configuration shown in FIG. 9 is equivalent to that shown in FIG. 8, where the product of the carrier frequency and the delay $\tau$ is equal to 145° or $3\pi/2$. In order to choose the time delay $\tau$, it is required, as in the previous embodiment, that the expected value coefficient of noise in r(t) to be zero. That is, $$\frac{1}{T} \int_t P_i(t) P_i(t - \tau) dt = 0. \tag{26}$$

For this case, the specific equation is $$\frac{1}{T} \int \cos(\omega_c t) \cos \omega_c (t - \tau) dt = \left( \frac{\cos \omega_c \tau}{2} \right). \tag{27}$$

In order for the term $\cos \omega_c \tau$ to be zero, the argument must be an integral number of radians plus $\pi/2$. In order that the "recognized" signal not be changed in sign, this requirement is further restricted to an integral number of $2\pi$ radians minus $\pi/2$; namely $$\omega_c \tau = 2\pi k = \pi/2. \tag{28}$$

A careful examination of the signal recognizer shown in FIG. 8 for the case where $\omega_c \tau = 3\pi/2$, reveals that the circuit can be configured as illustrated in FIG. 9, since $\cos(x) \sin(x) = ½ \sin(2x)$.

The reference function r(t), using equations (10), (25), and (28) becomes $$r(t) = A/2[1 + M(t - \tau)] \cos(\omega_c t) + N(t - \tau) \sin(2\omega_c t). \tag{29}$$

A frequency domain interpretation of equation (29) is illustrated in FIGS. 10 through 13.

Figure 10:
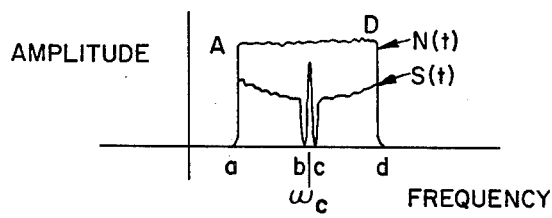
FIGS. 10 through 13 are spectrum diagrams useful in explaining the operation of an AM signal recognizer.
Figure 11:
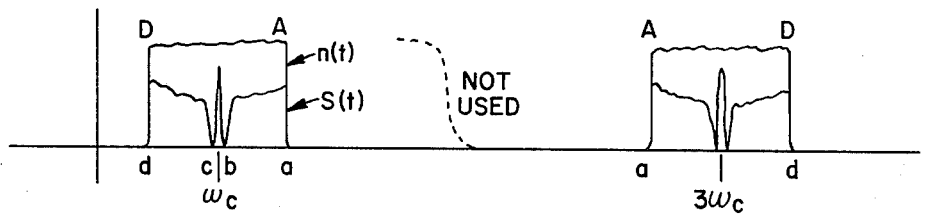

FIG. 10 shows spectrum amplitude plotted versus frequency for both uniform noise N(t) and the amplitude modulated signal S(t). Several points on the spectrum have been labeled in order to illustrate the action of the signal recognizer. The amplitude modulation signal S(t) is symmetrical about the carrier $\omega_c$ extending from frequency point b to point a and from point c to point d. The noise signal N(t) extends from point A to point D and is, of course, unsymmetrical. After multiplication by the term $\sin 2\omega_c t$, the spectrum shown in FIG. 11 is obtained. The sum frequencies of the multiplication—those appearing at a frequency three times the carrier frequency—need not be used in the signal recognizer and may be removed by a suitable filter (not shown). On the other hand, the difference frequency terms as noted appear again at the carrier frequency $\omega_c$. Due to the fact that this is a difference term, the resulting spectrum is frequency inverted—note that the spectral points labeled A and D in the original spectrum have been exchanged in their relative positions after multiplication by sin $2\omega_c t$. Since the noise spectrum is a random process, the inverted noise spectrum $\eta(t)$ will have zero correlation with the original noise spectrum $N(t)$. On the other hand, the signal spectrum is also inverted, but since it was initially symmetrical, it is unchanged by the inversion. Consequently, the signal in the reference function will be strongly correlated with the input signal.

Figure 12:
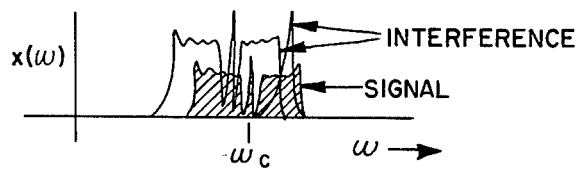
Figure 13:

The case of multiple jamming signals is illustrated in FIGS. 12 and 13. In the input spectrum which is labeled as $x(\omega)$, two jamming signals are shown along with a single signal $S(\omega)$. The signal has a carrier at frequency $\omega_c$. As has been postulated, the precise carrier frequency of a jamming signal does not coincide with the carrier frequency of the signal, even though the signal and jamming signals share the same bandwidth. The reference function as a function of frequency is illustrated in FIG. 13. Again, frequency inversion about the frequency $\omega_c$ has taken place as was the case described above in connection with FIGS. 10 and 11. When the reference function $r(t)$ is correlated with the input function $x(t)$, it is evident that only the signal term will yield average value. Beat frequencies will be obtained for the jamming signals, since frequency inversion was performed about a frequency not equal to their carrier frequencies.

This can be shown mathematically by assuming an input function of the following form:

$$\text{Ti } x(t) = S(t) + I(t) \tag{30}$$

where $$x(t) = A[1 + m(t) \cos \omega_c t] + \Sigma_j A_j f(t) \cos \omega_j t. \tag{31}$$

Note that the jamming signals have frequencies given by $\cos \omega_j t$. The signal recognizer provides a reference function $r(t)$ given by the following:

$$r(t) = A[1+m(t-\tau)] \cos \omega_c t + \Sigma_j A_j f(t-\tau) \cos [(2\omega_c - \omega_j)t + \theta_j]. \tag{32}$$

where $\theta_j = -\omega_j \tau$.

The correlation of the reference function with the input signal vector is obtained as:

$$\frac{1}{T} \int_t^{t+T} r(t)S(t)dt = \tag{33}$$

$$\frac{A^2}{2T} \int_t^{t+T} [1 + m(t)][1 + m(t-\tau)]dt +$$

$$\sum_j \frac{AA_j}{2T} \int_t^{t+T} [1 + m(t)]f(t-\tau)\cos[(\omega_c - \omega_j)t + \phi_j]dt$$

Examination of the second integral shows that terms involving the frequency $(\omega_c - \omega_j)$ are present. Obviously, these terms have a zero average value.

Note that the first integral above evaluates the power in the modulation of the AM transmission. Since the modulation is a very slowly varying function in comparison with the rate of variation of the carrier frequency, the modulation times delayed modulation is essentially equal to the modulation squared. Accordingly, $$E\{[1+m(t)][1+m(t-\tau)]\} \approx A^2/2 \, E\{[1+m(t)]^2\}. \tag{34}$$

Therefore, the reference function is highly correlated with the input desired signal.

Correlation of the reference function with the $k^{th}$ jamming signal present in the input function $x(t)$ may be expressed as $$\frac{1}{T} \int_t^{t+T} r(t)I_k(t)dt = \tag{35}$$

$$\frac{AA_k}{2T} \int_t^{t+T} f_k(t)[1 + m(t-\tau)]\cos[(\omega_c - \omega_j)t + \phi_j]dt +$$

$$\sum_j \frac{A_j A_k}{2T} \int_t^{t+T} f_k(t)f_j(t-\tau)\cos[(2\omega_c - \omega_k - \omega_j) + \theta_k + \theta_j]dt$$

The first integral again has terms containing the frequency difference $(\omega_c - \omega_j)$, and therefore has no average value. The second integral involves frequency differences $(2\omega_c - \omega_k - \omega_j)$, which are obtained from the cross products of the several jamming signals. This integral is zero provided that $$\omega_c \neq \left(\frac{\omega_k + \omega_j}{2}\right) \tag{36}$$

or that $$E\{f_k(t)f_j(t-\tau)\} = 0. \tag{37}$$

Since $f(t)$ is unity for a CW jamming signal, assumed decorrelation is dependent upon equation (36).

Since the signal recognizer is a correlation discriminant operator, applying equation (6) to equation (35) requires that the discriminant function times the delayed discriminant function contain no terms that are also present in the jamming signal times the delayed jamming signal. Thus, CW jammer intermodulation terms may produce an average value correlation even though the discriminant function itself has no correlation with the jamming signal. The constraint imposed by equation (36) can be removed if the reference function is filtered so as to pass only frequencies near the carrier frequency $\omega_c$, so as to eliminate the possibility of such correlation products being obtained.

Figure 14:
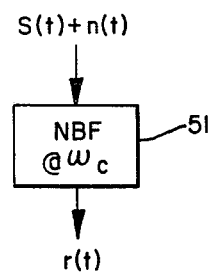
FIG. 14 is a block illustration of a narrowband filter signal processor.
Figure 15:
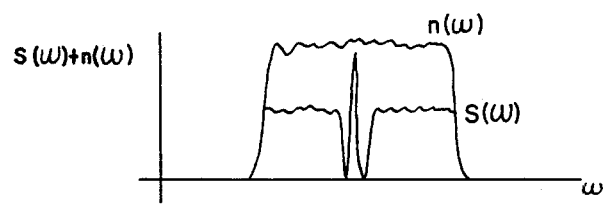
FIGS. 15 through 17 are spectrum diagrams useful in explaining the operation of a narrowband filter signal processor.
Figure 16:
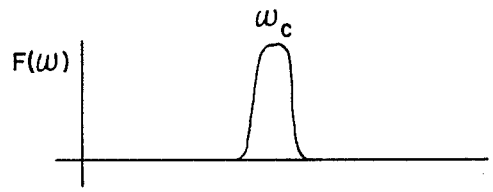
Figure 17:
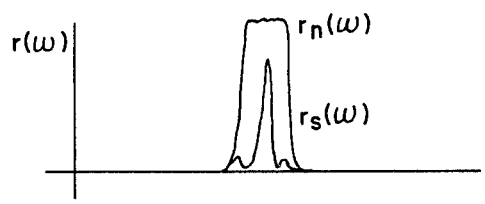

In order to better appreciate the advantages of the signal recognizer of the present invention in processing signals in an adaptive array system, a brief contrast between the signal recognizer approach with a conventional direct filtering approach will be presented. Schematically, the filtering technique is shown in FIG. 14. Signal $S(t)$ and noise $N(t)$ are input to a narrowband filter 51 centered about the carrier frequency $\omega_c$, and the output of filter 51 is the reference function $r(t)$. Relevant spectral diagrams are shown in FIGS. 15, 16, and 17. The input signal $S(t)$ and noise $N(t)$ are shown in FIG. 15, while the filter frequency response function is shown in FIG. 16. The reference function obtained is illustrated in FIG. 17. Comparison of the reference function of FIG. 17 with the input function of FIG. 15 clearly shows that the noise terms passed by the filter will correlate with the noise terms in the input. Therefore, it is evident that $$1/T \int n(t)r(t)dt \neq 0. \tag{38}$$

This means that a non-optimal array solution is obtained with a conventional direct filtering scheme. In fact, if the noise power is of the same bandwidth and density as the signal power, then no performance gain will be attained by the array.

CHIRP SIGNAL RECOGNIZER

A chirp signal is one in which the carrier frequency is changed linearly as a function of time. Applying the general signal representation characterized by equation (1), the expression is:

$$S(t) = d(t)\cos\left(\omega_c t + \left(\frac{\alpha t^2}{2}\right)\right) \tag{39}$$

Equation (39) may be expanded to yield $$S(t) = d(t)\left[\cos(\omega_c t)\cos\left(\frac{\alpha t^2}{2}\right) - \sin(\omega_c t)\sin\left(\frac{\alpha t^2}{2}\right)\right] \tag{40}$$

Figure 18:
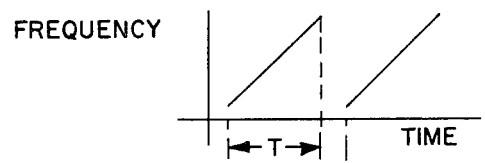
FIG. 18 is a signal waveform of a chirp signal.

In the above equations, the term responsible for the continuous change of frequency with time is $\alpha t^2/2$. Information is transmitted by the signal through the term d(t). This can be a biphase modulation or conventional amplitude modulation. A spectral illustration of the chirp signal is presented in FIG. 18. The duration of the chirp is seen to be of time T. After this time has elapsed, the chirp function is restarted. Therefore, in the frequency domain such a signal has a sawtooth waveform as a function of time as shown.

Figure 19:
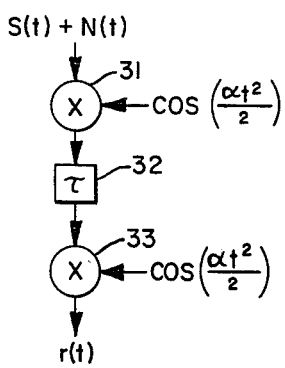
FIGS. 19 and 20 are functional block diagrams of a chirp signal recognizer.
Figure 20:
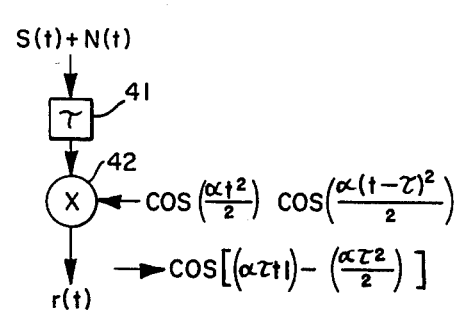

Two functional representations of signal recognizers for operating on a chirp signal are illustrated in FIGS. 19 and 20. In the recognizer shown in FIG. 19, the signal S(t)+N(t) is multiplied in multiplier 31 by chirp cos $\alpha t^2/2$, delayed in delay 32 by an amount $\tau$, then multiplied by the chirp again in multiplier 33. Unfortunately, the implementation of the precise generation of a coherent chirp as a function of time may be fairly difficult. Therefore, a preferred embodiment of a chirp signal recognizer is shown in FIG. 20. Here, delay 41 and multiplier 42 effectively multiply the delayed input by the product of the chirp times a delayed chirp. While at first this may appear to be a very difficult term to generate, expansion of the expression shows that the difference frequency is a constant frequency sinusoid. The different frequency of this product is given mathematically by the expression:

$$\cos[(\alpha\tau t) - (\alpha\tau^2/2)]. \tag{41}$$

There is a phase term given by $\alpha\tau^2/2$ which is constant.

Figure 21:
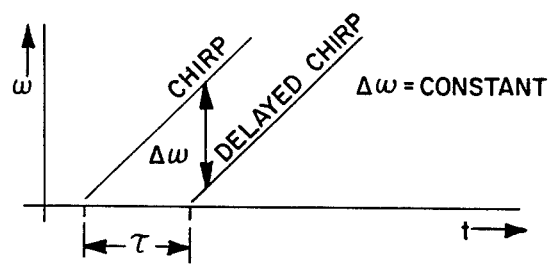
FIG. 21 is a signal waveform diagram useful for explaining the operation of a chirp signal recognizer.

A graphical interpretation of FIG. 20 is shown in FIG. 21 where a chirp and a delayed chirp are plotted as a function of time. Notice that the time delay $\tau$ establishes the frequency difference between the two waveforms and that this difference is a constant. It is unnecessary to generate the sum frequency term of the chirp and delayed chirp product, since disregarding this term leads merely to a loss of amplitude which can be made up with an amplifier.

Figure 22:
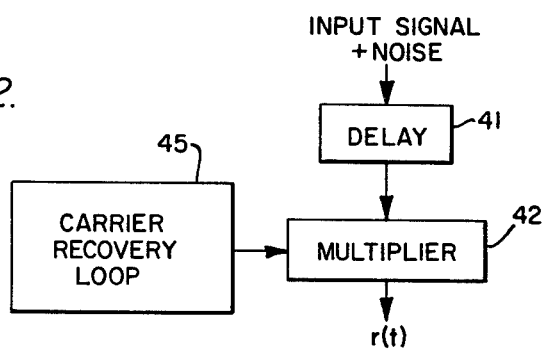
FIG. 22 is a schematic illustration of a practical embodiment of a signal recognizer for chirp input signals.

Thus, the chirp recognizer is remarkably simple consisting of time delay and a multiplication by a constant frequency sinusoid. More particularly, as shown in FIG. 22, the input signal S(t)+N(t) is delayed a prescribed delay time $\tau$ in delay 41 and the delayed signal is applied to one input of a multiplier 42. A second input of multiplier 42 is obtained via a suitable carrier recovery loop 45, which produces constant frequency sinusoid having a frequency $\omega = \alpha\tau$. The output of multiplier 42 represents the desired reference signal r(t).

The amount of time delay which is required in order to produce noise decorrelation is obtained from equations (26) and (41), so that $$(\alpha\tau T) = n(2\pi), \text{ where } \eta \text{ is an integer.} \tag{42}$$

From the foregoing description of the general configuration and operation of a signal recognizer, it will be appreciated that signal recognizers may be suitably configured not only for the signal environments described in detail above, but to numerous other modulation techniques, such as FSK signalling, FM signalling, etc. Moreover, combinations of signalling techniques, affording further protection against interference, such as jamming, may be handled by the appropriate signal recognizer suitably configured in accordance with the principles described above. As one example, consider a combination of PSK spread spectrum signalling and chirp transmission.

SPREAD SPECTRUM PSK-CHIRP SIGNAL RECOGNIZER

In this embodiment, the signal S(t) of interest, expressed as a product of terms may be written as $$S(t) = AC(t)d(t)\cos[\omega_c t + (\alpha t^2/2)] \tag{43}$$

where C(t) is a known pseudo-random bandwidth spreading function, d(t) is unknown data, and the bracketed Cos term is the chirp function.

The modulation product C(t) cos $[\omega_c t + (\alpha t^2/2)]$ may be expanded as $$C(t)(\cos \omega_c t + \cos \alpha t^2) - C(t)(\sin \omega_c t + \sin \alpha t^2) \tag{44}$$

Figure 23:
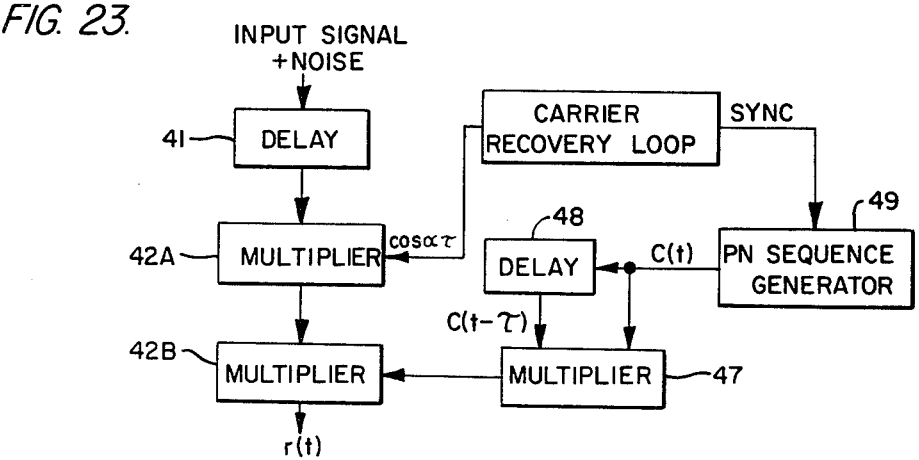
FIGS. 23 and 24 are schematic illustrations of practical signal recognizers for PSK-chirp signals.

FIG. 23 shows a suitable configuration for a signal recognizer for effecting correlation discriminant processing of a PSK-chirp signal, adopting the general delay-multiplier implementation shown in FIG. 4. Here, the input signal and noise are applied from the receiver (again, not shown) to a delay circuit 41 wherein the chirp and pseudo-random signals are delayed by a delay period. The output of delay $\tau$ is coupled to a pair of series-connected multipliers 42A and 42B. From the receiver carrier recovery loop a constant frequency $\omega = \alpha\tau$ is applied to multiplier 42A as one a priori reference signal, for the chirp component, while multiplier 42B receives the output of a multiplier 47. Multiplier 47 has a first input coupled to receive the pseudo-random sequence from PN sequence generator 49. The output of PN sequence generator 49 is further coupled to delay circuit 48, so that multiplier 47 provides the desired $C(t)C(t-\tau)$ input to multiplier 42B. Again, as was described above in connection with the PSK embodiment, the output of PN sequence generator 49 is appropriately synchronized by the carrier recovery loop, now shown. The output of multiplier 42B represents the desired reference signal r(t).

Figure 24:
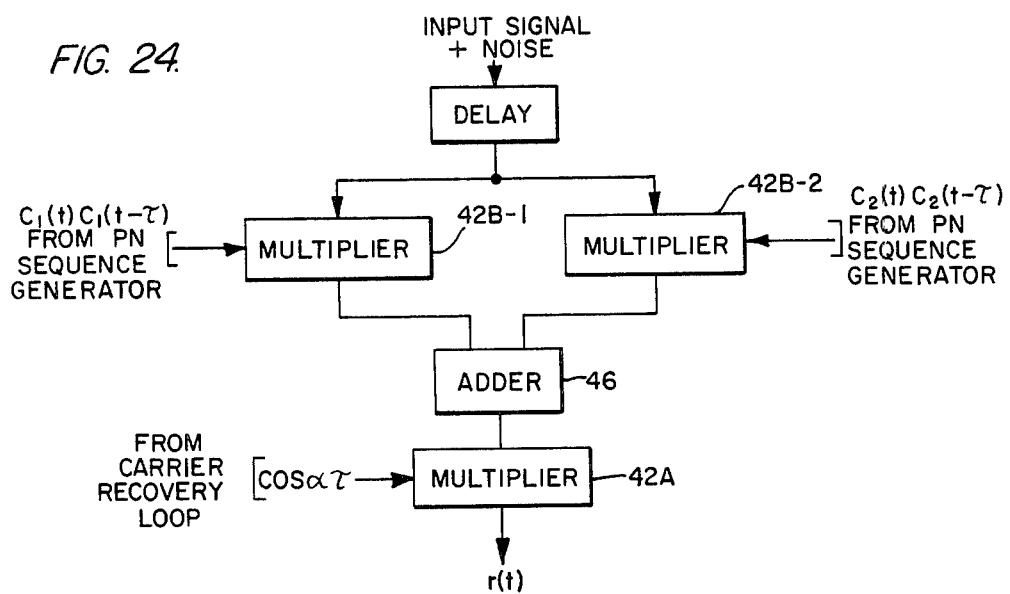

In the above-described PSK-chirp signal recognizer, a single PN sequence is employed. However, it is possible to employ a pair of orthogonal PN sequences, one of which will be used as a product for the chirp to create desired chirp-PSK signals. More specifically, a pair of PN codes $C_1(t)$ and $C_2(t)$ may be used to create a data modulation multiplier signal $$S(t)=A/2[(1-d(t))C_1(t)+(1+d(t))C_2(t)] \quad (45)$$

where $d(t)$ is biphase. From equation (45) it can be seen that if the data function is equal to $+1$, then $S(t)=AC_2(t)$. Similarly, if $d(t)=-1$, the signal component $AC_1(t)$ is transmitted, each $S(t)$ component being multiplied, of course, by the chirp signal $\cos[\omega_c t+(\alpha t^2/2)]$. With this signal modulation scheme, either one of the two PN sequences will be transmitted for each biphase data signal. A suitable signal recognizer configuration for effecting a correlation discriminant operator function on such a PSK-chirp signal is shown in FIG. 24 which, like the configuration shown in FIG. 23, adopts the general delay-multiplier implementation shown in FIG. 4.

The input PSK-chirp signal is again applied to a delay 41 wherein it is delayed by delay period $\tau$, and then fed to a pair of parallel-branched multipliers 42B-1 and 42B-2. The only constraint on $\tau$ is that it be greater than one chip, but it need not be less than one data bit. Since the PSK modulation component incorporates a pair of orthogonal PN codes $C_1(t)$ and $C_2(t)$, separate delay-multiplier circuits, corresponding to components 47, 48, and 49 in FIG. 23, are suitably employed for each PN sequence $C_i(t)$ to generate the necessary signal products $C_1(t)C_1(t-\tau)$ and $C_2(t)C_2(t-\tau)$. These respective signal products are applied to multipliers 42B-1 and 42B-2 wherein they are multiplied by the delayed input signal. The outputs of multipliers 42B-1 and 42B-2 are summed in adder 46. The output of adder 46 is supplied to multiplier 42A wherein the product sum from adder 46 is multiplied by the constant frequency signal $\omega=\alpha\tau$, as in the configuration shown in FIG. 23, thereby completing the correlation discriminant operator function for a chirp-PSK signal employing a pair of orthogonal PN sequences.

It will be appreciated that the signal recognizer of the present invention is applicable to modulation products other than those exemplified above. As was described previously, the basic requirement is that the signal term $S(t)$ can be expressed as a series of products $P_1(t), P_2(t) \ldots P_N(t)$.

Figure 25:
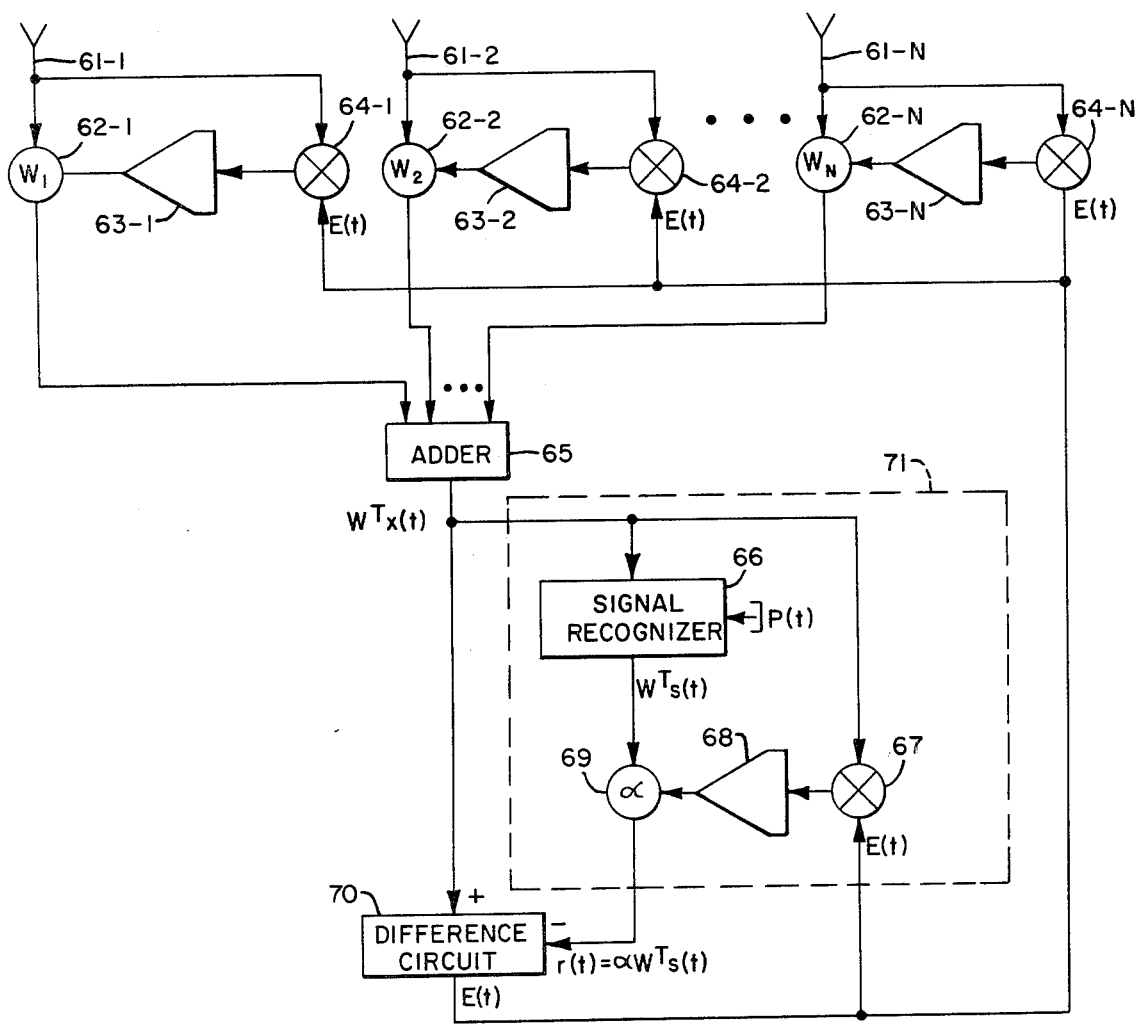
FIG. 25 is a schematic block diagram of an adaptive array receiver employing a signal recognizer and positive signal feedback network in accordance with the present invention.

Having described the principles and operation of a signal recognizer and various exemplary configurations that it may take, depending upon the type of signal being received, the overall configuration and operation of an adaptive array incorporating a signal recognizer will now be described. As was explained previously, pursuant to the present invention, control of the array weights is conducted in accordance with a positive signal feedback (PSF) control technique which substantially improves upon a conventional least mean squared (LMS) approach in which the system processing circuitry has sought to recreate the desired signal and thereby minimize the error or control parameter. FIG. 25 shows a block diagram of the components of which an adaptive array incorporating the signal recognizer and positive signal feedback control technique of the present invention may be configured.

As shown in FIG. 25, a plurality of suitable signal receivers, such as antennas 61-1 . . . 61-N, from which the input signals $x_1(t) \ldots x_N(t)$ of the array are derived, have their outputs coupled to respective weighting circuits 62-1 . . . 62-N and multipliers 64-1 . . . 64-N. Each weighting circuit 62-1 . . . 62-N may comprise a suitable multiplier for obtaining the product of the input signal from the antenna, to which one input is coupled, and the correlated weight value of a respective one of integrators 63-1 . . . 63-N. The input of each integrator is coupled to the output of a respective one of multipliers 64-1 . . . 64-N. A second input of each of multipliers 64-1 . . . 64-N is coupled to receive an error signal $\epsilon(t)$, to be described in more detail below, from difference circuit 70.

The output of each weighting circuit 62-1 . . . 62-N is summed in adder 65 to produce a weight summation sequence signal $W^T(t)x(t)$. This summation signal is applied as one input of difference circuit 70, multiplier 67, and an appropriate signal recognizer 66. The configuration of signal recognizer 66 may suitably take on one of the multiplier/delay implementations described above, in accordance with the type of signal modulation under consideration. For example, assuming that the input signals to antennas 61-1 . . . 61-N are spread spectrum PSK signals, then a signal recognizer configuration such as that shown in FIG. 6 may be incorporated as component 66. The output of signal recognizer 66 is coupled to a scaling multiplier 69 wherein the signal recognizer output $W^T S(t)$ is multiplied by the output of an integrator 68. The input of integrator 68 is coupled to the output of a multiplier 67, one input of which is coupled to the output of adder 65, as explained above, and another input of which is obtained from the output of difference circuit 70. The output of scaling multiplier 69 is coupled to the subtraction $(-)$ input of difference circuit 70.

Considering now the operation of the overall adaptive array system shown in FIG. 25, at the output of each of the array of signal receiver elements, namely, antennas 61-1 . . . 61-N, there are produced antenna voltages representative of respective signal and noise components received by each antenna. These voltages are fed to weighting circuits 62-1 . . . 62-N wherein they are multiplied by prescribed weighting coefficients. The weighting coefficients $W_1 \ldots W_N$ are produced by correlating the antenna voltages with an error signal $\epsilon(t)$, the generation of which will be described in more detail below. For this purpose, each antenna voltage $x_i(t)$ is multiplied in a respective one of multipliers 64-1 . . . 64-N by the error signal $\epsilon(t)$. The resulting product $x_i(t) \epsilon(t)$ is integrated in a respective one of integrators 63-1 . . . 63-N, to produce a correlation generated weighting function to be multiplied by the antenna voltage in weighting circuit 62-i. The weighted antenna voltages are summed together in adder 65 to produce an array signal summation output that is to be used to realize the reference function $r(t)$, by which the error signal $\epsilon(t)$ is produced. This summation output $W^T x(t)$ from adder 65 is the desired signal plus uncorrelated noise having the best available signal-to-noise ratio. This scalar signal is applied to signal recognizer 66 wherein, for the PSK signal of interest, it is subjected to the delay and multiplication operations described above to produce another scalar sequence output of desired signal $W^T S(t)$ plus a new uncorrelated noise component, that will be used to generate the reference signal $r(t)$. The reference signal multiplier $\alpha$ is produced by correlating the weighted array or sum sequence output $W^T x(t)$ from adder 65 with the output of difference circuit 70. To this end, the output of adder 65 is multiplied in multiplier 67 by the error signal $\epsilon(t)$ and the product is integrated in integrator 68 to yield a multiplier $\alpha$. The output of signal recognizer 66 is multiplied in multiplier 69 by the output of integrator 68 to produce the reference signal $r(t)=\alpha W^T S(t)$. This reference signal is then substracted in difference circuit 70 from the output of adder 65 to produce the error signal $\epsilon(t)=W^T x(t)-\alpha W^T S(t)$, by way of which the weights of the antenna outputs are adjusted and by way of which the reference signal r(t) itself has been produced from the correlation of the array signal vector with the error signal.

Within the system, the operation of which has been described above, the positive signal feedback portion 71, which incorporates a signal recognizer that performs a correlation discriminant operator function, effectively functions so as to maximize the broad band signal-to-noise ratio produced at the output of adder 65. This signal processing approach differs considerably from a conventional adaptive array error generation approach wherein the system attempts to recreate the desired signal as the reference r(t), and thereby minimize the error $\epsilon(t)$, and offers considerable advantages as a result.

By virtue of the generation of the scaling multiplier $\alpha$ in the positive signal feedback network 71, arbitrary scaling of the weights $W_1(t) \ldots W_N(t)$ is possible without changing the output signal-to-noise ratio. In this regard, it is possible to fix one of the weights $W_1 \ldots W_N$. This eliminates the possibility of failure to adapt to weak signals or small integration constants of integrator 68, since a zero weight vector cannot occur. Thus, during signal acquistion, if a desired signal is not present, namely, there is no useful S(t) input to signal recognizer 66, then the output of signal recognizer 66 will be simply uncorrelated noise $\eta(t)$. As a result, the array weights $W_1 \ldots W_N$ tend to suppress all signals in the array environment, so that the effective antenna pattern contains nulls in the direction of all jamming signals.

Meanwhile, the positive signal feedback network 71 is caused to respond, so that the multiplier $\alpha$ is set at its maximum value in anticipation of a desired signal appearing. When such a desired signal does appear, it is likely that substantial pattern gain toward the desired signal exists due to the resultant suppression pattern.

The fact that the array has pre-suppressed any jammers and almost invariably has substantial gain toward the desired signal at the positive instant that the signal appears is a very important system benefit of the signal feedback network 71. As time progresses after appearance of the desired signal, positive signal feedback network 71 causes a refinement of the desired signal gain, so as to maximize signal-to-noise ratio, completing the adaptation transient of the signal processing scheme.

In comparison, a conventional least mean squared (LMS) system would have to start from a weight vector solution of zero, trying to establish nulls on the interferences while simultaneously trying to bring up gain on the desired signal. If the desired signal is relatively short in duration, the LMS array might never obtain a useful solution.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In a communication system wherein transmitted signals containing an information component, unknown at a receiver site, are received at said receiver site, said receiver site including signal recovery means for recovering, from among the received signals which include a noise component, said unknown information component absent said noise component, the improvement wherein said signal recovery means includes:
   an input to which a received signal containing an unknown information component and a noise component is applied;
   first means for generating a prescribed reference signal the contents of which are defined exclusive of said unknown information component; and
   second means, coupled to said input and said first means, and exclusive of bandpass filter means, for combining said received signal with said reference signal so as to produce therefrom an output signal containing an information component that is effectively correlated with the unknown information component contained in said received signal and a noise component that is effectively uncorrelated with any other signal.

2. An improved signal recovery means in a communication system according to claim 1, wherein said second means comprises:
   third means, coupled to said input and said first means, for multiplying said reference signal by said received signal and producing therefrom a first product signal;
   fourth means, coupled to said third means, for delaying said first product signal by a prescribed period of time; and
   fifth means, coupled to said first means and said fourth means, for multiplying the delayed first product signal by said reference signal and producing therefrom a second product signal as said output signal.

3. An improved signal recovery means in a communication system according to claim 1, wherein said second means comprises:
   third means, coupled to said input, for delaying said received signal by a prescribed period of time;
   fourth means, coupled to said first means, for producing a first product signal representative of the product of said reference signal and the reference signal delayed said prescribed period of time: and
   fifth means, coupled to said third and fourth means, for multiplying the delayed received signal by said first product signal to produce therefrom a second product signal as said output signal.

4. An improved signal recovery means in a communication system according to claim 1, wherein said received signal is constituted of a product of a plurality of signals including said unknown information component and said reference signal contains a signal of which said product of a plurality of signals is constituted but exclusive of said unknown information component.

5. An improved signal recovery means in a communication system according to claim 1, wherein said transmitted signals contain said unknown information component modulated with a prescribed signal component, and wherein said first means includes means for generating, as said prescribed reference signal, said prescribed modulation signal component.

6. An improved signal recovery means in a communication system according to claim 5, wherein said transmitted signals further contain a carrier frequency signal onto which said unknown information component and said prescribed modulation signal component are modulated.

7. An improved signal recovery means in a communication system according to claim 5, wherein said prescribed modulation signal component comprises a spreading pseudo-noise signal.

8. An improved signal recovery means in a communication system according to claim 5, wherein said prescribed modulation signal component comprises a carrier frequency signal the amplitude of which is modulated by said unknown information signal.

9. An improved signal recovery means in a communication system according to claim 5, wherein said transmitted signals contain a chirped carrier frequency signal, said prescribed modulation signal component corresponding to a constant frequency oscillation signal.

10. In a communication system wherein transmitted signals containing an information component, unknown at a receiver site, are received at said receiver site, said receiver site including signal recovery means for recovering, from among the received signals which include a noise component, said unknown information component absent said noise component, the improvement wherein said signal recovery means includes
an input to which a received signal containing said unknown information component and a noise component is applied;
first means for generating a prescribed reference signal the contents of which are defined exclusive of said unknown information signal;
second means, coupled to said input and said first means, for multiplying said prescribed reference signal by said received signal and producing therefrom a first product signal;
third means, coupled to said second means and exclusive of a bandpass filter means, for delaying said first product signal by a prescribed period of time; and
fourth means, coupled to said first means and said third means, for multiplying the delayed first product signal by said prescribed reference signal and producing therefrom a second product signal as an output signal containing an information component that is effectively correlated with the unknown information component contained in said received signal and a noise component that is effectively uncorrelated with any other signal.

11. An improved signal recovery means in a communication system according to claim 10, wherein the unknown information component of said received signal includes a spread PSK modulation signal and said prescribed reference signal contains a pseudo-nois sequence signal.

12. An improved signal recovery means in a communication system according to claim 10, wherein the unknown information component of said received signal includes an amplitude modulation signal and said prescribed reference signal contains the carrier frequency of said amplitude modulation signal.

13. An improved signal recovery means in a communication system according to claim 10, wherein said transmitted signals contain said unknown information component modulated with a prescribed signal component, and wherein said first means includes means for generating, as said prescribed reference signal, said prescribed modulation signal component.

14. An improved signal recovery means in a communication system according to claim 13, wherein said transmitted signals further contain a carrier frequency signal onto which said unknown information component and said prescribed modulation signal component are modulated.

15. In a communication system wherein transmitted signals containing an information component, unknown at a receiver site, are received at said receiver site, said receiver site including signal recovery means for recovering, from among the received signals which include a noise component, said unknown information component absent said noise component, the improvement wherein said signal recovery means includes:
an input to which a received signal containing the unknown information component and a noise component is applied;
first means, coupled to said input, for delaying said received signal by a prescribed period of time and thereby generating a delayed received signal;
second means for generating a signal representative of the product of a prescribed reference signal and the reference signal delayed by said prescribed period of time, said prescribed reference signal being defined exclusive of said unknown information signal; and
third means, coupled to said first means and said second means, for multiplying the delayed received signal by said product representative signal to thereby produce an output signal containing an information component that is effectively correlated with the information component contained in said received signal and a noise component that is effectively uncorrelated with any other signal.

16. An improved signal recovery means in a communication system according to claim 15, wherein the information component of said received signal includes an amplitude modulation signal and said prescribed reference signal contains a sinusoidal signal at twice the carrier frequency of said amplitude modulation signal.

17. An improved signal recovery means in a communication system according to claim 15, wherein the information component of said received signal includes a chirp signal and said prescribed reference signal contains a constant frequency oscillation signal.

18. An improved signal recovery means in a communication system according to claim 17, wherein said information component of said received signal further includes at least one spread PSK modulation signal and said prescribed reference signal contains at least one pseudo-noise sequence signal.

19. An improved signal recovery means in a communication system according to claim 18, wherein said information component of said received signal further includes a plurality of respectively different spread PSK modulation signals and said prescribed reference signal contains a plurality of respectively different pseudo-noise sequence signals.

20. An improved signal recovery means in a communication system according to claim 19, wherein said plurality of respectively different pseudo-noise sequence signals are comprised of first and second mutually orthogonal pseudo-noise sequence signals.

21. An improved signal recovery means in a communication system according to claim 15, wherein said transmitted signals contain said unknown information component modulated with a prescribed signal component, and wherein said first means includes means for generating, as said prescribed reference signal, said prescribed modulation signal component.

22. An improved signal recovery means in a communication system according to claim 21, wherein said transmitted signals further contain a carrier frequency signal onto which said unknown information component and said prescribed modulation signal component are modulated.

23. In an adaptive signal receiver array containing a plurality of signal receiver elements, a plurality of coefficient weighting circuits respectively coupled to the outputs of said receiver elements, an adder circuit coupled to the outputs of said weighting circuits and a control circuit for adjusting the coefficients of said weighting circuits in accordance with variations in the output of said adder circuit, the improvement wherein said control circuit comprises means for generating weight coefficient adjustment signals by maximizing the signal-to-noise ratio of the output of said adder circuit, and wherein the output of said adder circuit is a signal containing an information component and a noise component, and wherein said control circuit includes means for combining the output of said adder circuit with a prescribed reference signal and producing therefrom an output signal containing an information component that is effectively correlated with the information component contained in the output of said adder circuit and a noise component that is effectively uncorrelated with any other signal, and wherein said maximizing means includes means for maximizing the ratio of said effectively correlated information component to the noise component contained in the signal output of said adder circuit.

24. The improvement according to claim 23, wherein said control circuit further includes means for correlating the output of said adder circuit with a weighting coefficient adjustment signal, means for multiplying the output of said combining means by the output of said correlating means, and means for subtracting the output of said multiplying means from the output of said adder to thereby produce an error difference signal as said weighting coefficient adjustment signal.

25. In a communication system wherein a transmitted signal is received at a plurality of receiving element at a receiver site, said receiver site including means, coupled to said plurality of receiving elements, for producing a received summation signal representative of the sum of a plurality of received signals, an improved signal processing circuit comprising:
   an input to which an input signal representative of the sum of a plurality of received signals is applied, said input signal containing a first prescribed component and a second prescribed component;
   first means, coupled to said input, for receiving said input sum and producing there from an outputsignal representative of the sum of a plurality of signals;
   second means, coupled to said input, for correlating said input sum with an error signal and generating thereby an output correlation signal;
   third means, coupled to said first means and said second means, for multiplying the output of said second means by said output sum; and
   fourth means, coupled to said input and said third means, for subtracting the output of said third means from said input sum to thereby produce said error signal and effectively maximize the ratio of said output sum to said input sum.

26. A signal processing circuit according to claim 25, further including means for modifying each of the plurality of signals contained in the sum applied to said input in accordance with said error signal.

27. A signal processing circuit according to claim 25, wherein said first means includes means for combining said input sum signal with a prescribed reference signal to produce therefrom said output sum a first prescribed portion of which is effectively correlated with a first prescribed portion of said input sum and a second prescribed portion of which is uncorrelated with any other signal.

28. In a communication system wherein transmitted signals containing an information component, unknown at a receiver site, are received at said receiver site, said receiver site including signal recovery scheme for recovering, from among the received signals which include a noise component, said unknown information component absent said noise component, the improvement wherein said signal recovery scheme includes the method steps of:
   (a) generating a prescribed reference signal the contents of which are defined exclusive of said unknown information component; and
   (b) combining, exclusive of a bandpass filtering operation, said received signal and said reference signal and producing therefrom an output signal containing an information component that is effectively correlated with the unknown information component contained in said signal to be processed and a noise component that is effectively uncorrelated with any other signal.

29. A method according to claim 28, wherein said received signal is constituted of a product of a plurality of signals including said unknown information component.

30. A method according to claim 28, wherein said received signal includes a spread PSK modulation signal and said prescribed reference signal contains a pseudo-noise sequence signal.

31. A method according to claim 28, wherein the unknown component of said input signal includes an amplitude modulation signal and said prescribed reference signal contains the carrier frequency of said amplitude modulation signal.

32. A method according to claim 28, wherein step (b) comprises the steps of:
   (b1) multiplying said reference signal by said received signal and producing therefrom a first product signal;
   (b2) generating a delayed signal by delaying said first product signal by a prescribed period of time; and
   (b3) multiplying the delayed first product signal by said reference signal and producing therefrom a second product signal as said output signal.

33. A method according to claim 28, wherein step (b) comprises the steps of:
   (b1) generating a delayed signal by delaying said received signal by a prescribed period of time;
   (b2) producing a first product signal representative of the product of said reference signal and the reference signal delayed said prescribed period of time; and
   (b3) multiplying the delayed signal by said first product signal to produce therefrom a second product signal as said output signal.

34. In a communication system wherein transmitted signals containing an information component, unknown at a receiver site, are received at said receiver site, said receiver site including signal recovery scheme for recovering, from among the received signals which include a noise component, said unknown information component absent said noise component, the improvement wherein said signal recovery scheme includes the method steps of:
(a) generating a delayed signal by delaying said received signal by a prescribed period of time;
(b) generating a first product signal representative of the product of a prescribed reference signal containing a known component of said received signal but exclusive of said unknown component and the reference signal delayed by said prescribed period of time; and
(c) generating an output signal by multiplying the delayed signal by said product signal, to thereby produce said output signal containing an information component that is effectively correlted with the unknown information component contained in said received signal and a noise component that is effectively uncorrelated with any other signal.

35. A method according to claim 34, wherein said received signal includes an amplitude modulation signal and said prescribed reference signal contains a sinusoidal signal at twice the carrier frequency of said amplitude modulation signal.

36. A method according to claim 34, wherein said received signal includes a chirp signal and said prescribed reference signal contains a constant frequency oscillation signal.

37. A method according to claim 36, wherein said received signal further includes at least one spread PSK modulation signal and said prescribed reference signal contains at least one pseudo-noise sequence signal.

38. A method according to claim 37, wherein said received signal further includes a plurality of respectively different spread PSK modulation signals and said prescribed reference signal contains a plurality of respectively different pseudo-noise sequencce signals.

39. A method according to claim 37, wherein said plurality of respectively different pseudo-noise sequence signals are comprised of first and second mutually orthogonal pseudo-noise sequence signals.

40. In an adaptive signal receiver array containing a plurality of signal receiver elements, a plurality of coefficient weighting circuits respectively coupled to the outputs of said receiver elements, and an adder circuit coupled to the outputs of said weighting circuits and wherein the coefficients of said weighting circuits are adjusted in accordance with variations in the output of said adder circuit,
a process for adjusting the weight coefficients by maximizing the signal-to-noise ratio of the output of said adder circuit, wherein
the output of said adder circuit is a signal containing an information component and a noise component, and wherein said adjusting process includes the steps of
combining the output of said adder circuit with a prescribed reference signal and producing therefrom an output signal containing an information component that is effectively correlated with the information component contained in the output of said adder circuit and a noise component that is effectively uncorrelated with any other signal, and
maximizing the ratio of said effectively-correlated information component to the noise component contained in the signal output of said adder circuit.

41. A process according to claim 40, further including the steps of:
generating a correlation signal by the output of said adder circuit with a weighting coefficient adjustment signal,
generating a product signal by multiplying said output signal by said correlation signal,
generating an error difference signal by subtracting the product signal from the output of said adder and,
coupling said error difference signal to said weighting circuits to thereby adjust said weighting coefficients.

42. In a communication system wherein a transmitted signal is received at a plurality of receiving element at a receiver site, said receiver site including means, coupled to said plurality of receiving elements, for producing a received summation signal representative of the sum of a plurality of received signals, an inproved method for controlling the operation of said system so as to maximize said received summation signal with a sequence of signals comprising the steps of:
(a) combining said received summation signal with a prescribed reference signal corresponding to a known component of each of said received summation signal and sequence of signals and producing therefrom a summation of said sequence of signals;
(b) generating a correlation signal by correlating said received summation signal with an error signal;
(c) generating a product signal by multiplying said error signal by said summation of said sequence of signals produced in step (a); and
(d) generating a difference signal by subtracting the product signal produced in step (c) from said received summation signal to thereby produce said error signal.

43. A method according to claim 42, further comprising the step of:
(e) modifying each of the plurality of signals of which said received summation signal is comprised in accordance with said error signal produced in step (d).

* * * * *